US010352377B2

(12) United States Patent
Gabela et al.

(10) Patent No.: US 10,352,377 B2
(45) Date of Patent: Jul. 16, 2019

(54) ADJUSTABLE CLUTCH CONTROL BASED UPON DRIVE MODE

(71) Applicant: JAGUAR LAND ROVER LIMITED, Warwickshire (GB)

(72) Inventors: Philip Gabela, Coventry (GB); Philip Newman, Coventry (GB); Joseph Walsh, Coventry (GB); Fernando Lages, Coventry (GB); Florin Aftanasa, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 117 days.

(21) Appl. No.: 15/556,320

(22) PCT Filed: Feb. 26, 2016

(86) PCT No.: PCT/EP2016/054051
§ 371 (c)(1),
(2) Date: Sep. 7, 2017

(87) PCT Pub. No.: WO2016/142187
PCT Pub. Date: Sep. 15, 2016

(65) Prior Publication Data
US 2018/0094678 A1 Apr. 5, 2018

(30) Foreign Application Priority Data
Mar. 10, 2015 (GB) .................................. 1504050.4

(51) Int. Cl.
*F16D 48/06* (2006.01)

(52) U.S. Cl.
CPC ...... *F16D 48/06* (2013.01); *F16D 2500/1082* (2013.01); *F16D 2500/1083* (2013.01);
(Continued)

(58) Field of Classification Search
CPC ............. F16D 48/06; F16D 2500/1082; F16D 2500/31413; F16D 2500/31486; F16D 2500/7041; F16D 2500/70412
See application file for complete search history.

(56) References Cited

U.S. PATENT DOCUMENTS 6,050,379 A * 4/2000 Lyon ....................... F16D 28/00
192/54.1
2003/0014172 A1 1/2003 Burgart et al.
(Continued)

FOREIGN PATENT DOCUMENTS

EP  0601728 A1  6/1994
GB  2170571 A   8/1986
(Continued)

OTHER PUBLICATIONS

International Search Report and Written Opinion of the International Searching Authority for International application No. PCT/EP2016/054051 dated May 24, 2016.
(Continued)

*Primary Examiner* — Edwin A Young
(74) *Attorney, Agent, or Firm* — Carlson, Gaskey & Olds

(57) ABSTRACT

An illustrative example vehicle torque control system includes a clutch that is at least partially automatically controllable. A manual clutch control means allows a driver to control engagement of the clutch. A clutch control means automatically controls a characteristic of clutch engagement based on a selected drive mode.

13 Claims, 2 Drawing Sheets

(52) U.S. Cl.
    CPC .............. *F16D 2500/10412* (2013.01); *F16D 2500/31413* (2013.01); *F16D 2500/31486* (2013.01); *F16D 2500/50858* (2013.01); *F16D 2500/7041* (2013.01); *F16D 2500/70412* (2013.01)

(56) References Cited

U.S. PATENT DOCUMENTS

| | | | |
|---|---|---|---|
| 2005/0211524 A1* | 9/2005 | DeVore | F16D 48/06 192/3.63 |
| 2010/0063699 A1* | 3/2010 | O'Dea | F16D 48/06 701/67 |
| 2011/0015035 A1 | 1/2011 | Marcigliano et al. | |

FOREIGN PATENT DOCUMENTS

| | | |
|---|---|---|
| WO | 92/13208 | 8/1992 |
| WO | 2014/135831 A2 | 9/2014 |

OTHER PUBLICATIONS

Combined Search and Examination Report under Sections 17 and 18(3) for Application No. GB1504050.4 dated Sep. 17, 2015.

\* cited by examiner

ADJUSTABLE CLUTCH CONTROL BASED UPON DRIVE MODE

TECHNICAL FIELD

The present disclosure relates to vehicle clutch control based upon drive mode. Aspects of the invention relate to a system, a vehicle and a method.

BACKGROUND

Automotive vehicles typically include a transmission for delivering torque produced by the engine to the wheels. A clutch selectively couples the engine with the transmission in a well-known manner. Manual transmissions typically require the driver to select a gear and to control clutch engagement by using a clutch pedal, for example. Automatic transmissions do not require manual gear selection or clutch control.

With manual transmissions, a driver's ability to achieve a desired clutch engagement depends on the driver's experience and finesse with the clutch pedal. For example, a driver may not be able to experience different clutch engagement behavior without developing the ability to manipulate the clutch pedal with finesse.

It is an aim of this invention to avoid the disadvantages of the prior art.

SUMMARY OF THE INVENTION

An illustrative example embodiment of a torque delivery control system includes a clutch that is at least partially automatically controllable. A manual clutch control means can be manipulated by a driver for manually controlling engagement of the clutch. A control means is configured to adjust a characteristic of the engagement of the clutch operates based on a selected drive mode. The characteristic of engagement comprises a relationship between a position of the manual clutch control means and engagement of the clutch.

In an embodiment having one or more features of the system of the previous paragraph, the control means selects a first characteristic of the engagement for a first drive mode, and selects a second, different characteristic of the engagement for a second, different drive mode.

In an example embodiment having one or more features of the system of the previous paragraph, the control means selects a third, different characteristic for a third, different drive mode.

In an embodiment having one or more features of the system of the previous paragraphs, the first drive mode comprises a normal drive mode, the second drive mode comprises a sport or performance mode, and the third drive mode comprises an enhanced traction mode.

In an example embodiment having one or more features of the system of the previous paragraphs, the control means causes a more rapid engagement of the clutch during the second drive mode compared to engagement of the clutch during the first drive mode and the control means causes a slower engagement of the clutch during the third drive mode compared to engagement of the clutch during the first drive mode.

In an embodiment having one or more features of the system of any of the previous paragraphs, the characteristic of engagement comprises a speed of clutch engagement.

In an embodiment having one or more features of the system of any of the previous paragraphs, the manual clutch control means comprises a clutch pedal that may be released to engage the clutch and the control means controls the characteristic of engagement during driver release of the clutch pedal.

An embodiment having one or more features of the system of any of the previous paragraphs includes a drive mode selection means that is manually manipulatable for selecting the drive mode. A vehicle supervisory control means determines the drive mode and the control means determines the drive mode based on an indication from the vehicle supervisory control means.

An illustrative example embodiment of a vehicle includes one or more features of the system of any of the previous paragraphs.

An illustrative example embodiment of a method of controlling torque delivery using a clutch that is at least partially automatically controllable. A manual clutch control can be manipulated by a driver to manually control engagement of the clutch. A controller is configured to adjust a characteristic of the engagement of the clutch based on a selected drive mode. The characteristic of engagement comprises a relationship between a position of the manual clutch control means and engagement of the clutch.

An illustrative example embodiment of a method of controlling torque delivery using a clutch that is at least partially automatically controllable includes determining that a driver desires clutch engagement and automatically adjusting a characteristic of the engagement of the clutch based on a selected drive mode.

In an embodiment of a method having one or more features of the method of the previous paragraph, the automatically adjusting comprises selecting a first characteristic of the engagement for a first drive mode and selecting a second, different characteristic of the engagement for a second, different drive mode.

In an example embodiment of a method having one or more features of the method of either of the previous paragraphs, the automatically adjusting comprises selecting a third, different characteristic of the engagement for a third, different drive mode.

In an embodiment of a method having one or more features of the method of any of the previous paragraphs, the first drive mode comprises a normal drive mode, the second drive mode comprises a sport or performance mode, and the third drive mode comprises an enhanced traction mode.

An embodiment of a method having one or more features of the method of any of the previous paragraphs includes causing a sharper engagement of the clutch during the second drive mode compared to engagement of the clutch during the first drive mode and causing a gentler engagement of the clutch during the third drive mode compared to engagement of the clutch during the first drive mode.

An embodiment of a method having one or more features of the method of any of the previous paragraphs, the characteristic of engagement comprises a speed of clutch engagement.

An embodiment of a method having one or more features of the method of any of the previous paragraphs, a manual clutch control means comprises a clutch pedal that may be released by the driver to engage the clutch and the characteristic of engagement is controlled during driver release of the clutch pedal.

An example embodiment of a vehicle comprises a controller that is configured to perform the method of any of the previous paragraphs.

In some but not necessarily all examples of the present disclosure there is provided a torque delivery control system that includes a clutch that is at least partially automatically controllable. A manual clutch control means can be manipulated by a driver for manually controlling engagement of the clutch. A control means for adjusting a characteristic of the engagement of the clutch operates based on a selected drive mode.

In some but not necessarily all examples of the present disclosure there is provided a method of controlling torque delivery using a clutch that is at least partially automatically controllable. A manual clutch control can be manipulated by a driver to manually control engagement of the clutch. A controller is configured to adjust a characteristic of the engagement of the clutch based on a selected drive mode.

Aspects and embodiments of the invention provide a system, a vehicle, and a method claimed in the appended claims.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Embodiments of this invention provide adjustable or variable control over clutch engagement that allows for different clutch engagement characteristics for different driving situations. An example disclosed embodiment adjusts a characteristic of clutch engagement based upon a drive mode selected by a driver of a vehicle.

Figure 1:
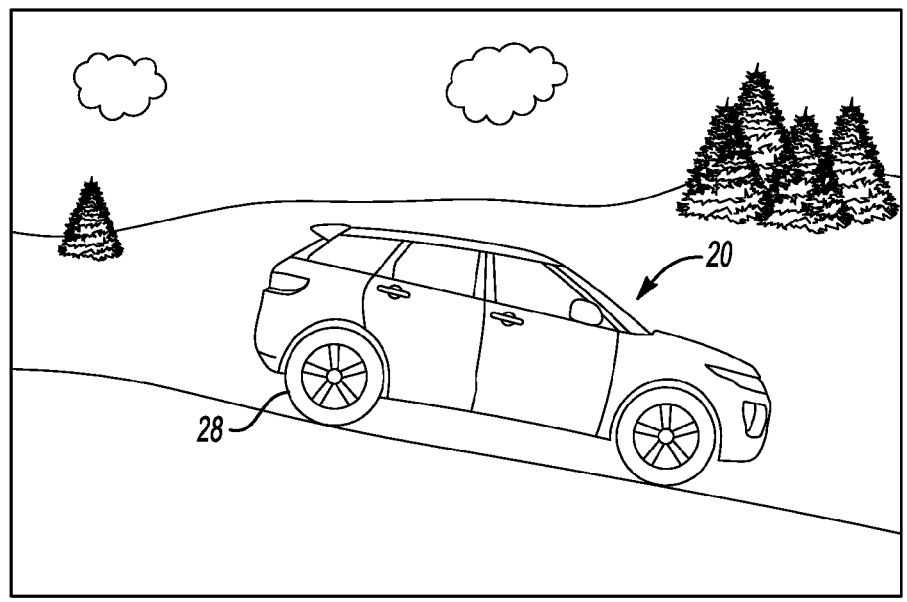
FIG. 1 diagrammatically illustrates an example embodiment of a vehicle including a torque delivery control system designed according to an embodiment of this invention.
Figure 2:
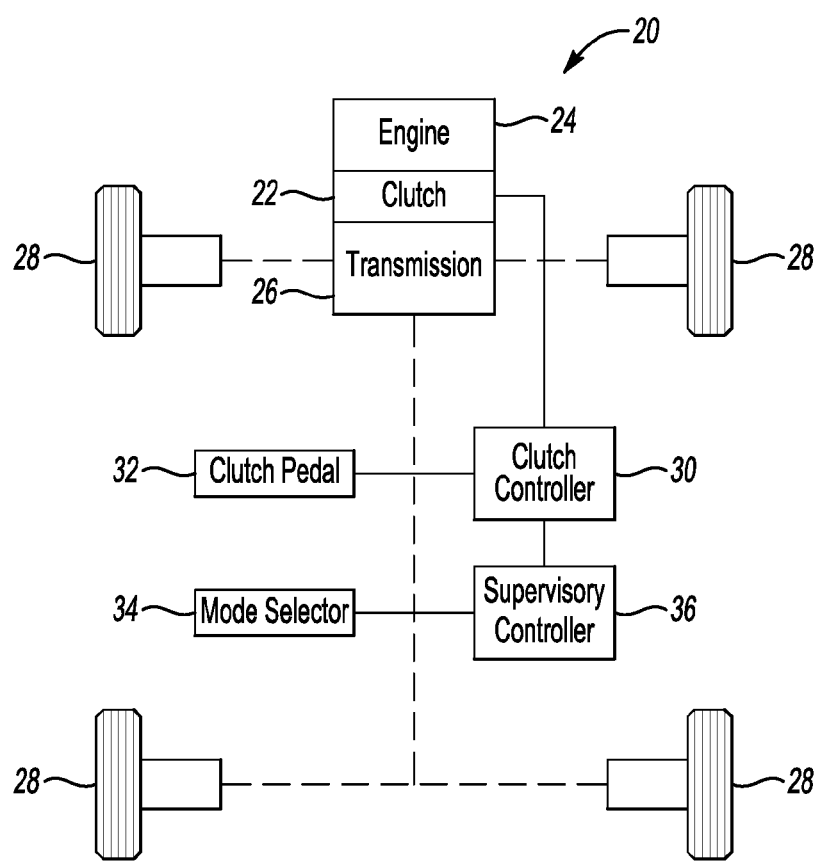
FIG. 2 schematically illustrates selected portions of a vehicle including a torque delivery control system designed according to an embodiment of this invention.

FIGS. 1 and 2 illustrate selected features of a vehicle 20. A clutch 22 selectively couples an engine 24 and transmission 26 for delivering torque to wheels 28 to cause desired movement of the vehicle 20. The clutch 22 in this example is at least partially automatically controllable. A clutch control means 30 for controlling or modifying operation of the clutch 22 adjusts or modifies a characteristic of clutch engagement under selected circumstances. The clutch control means 30 in some examples comprises a processor or electronic controller that is suitably programmed to achieve the desired clutch control. The processor may be a dedicated or distinct device or may be a portion of a processor that performs other functions or operations. In some embodiments a plurality of controllers operate as the clutch control means 30. For example, the clutch control means 30 may be realized through a clutch controller, an engine controller and a driving mode controller.

The example of FIG. 2 includes a manual clutch control means 32 for allowing a driver to manually control whether the clutch 22 is released or engaged. In some examples, the manual clutch control means 32 comprises a clutch pedal that may be manipulated by a driver to control the engagement of the clutch 22.

The example vehicle 20 includes a drive mode selection means 34 for allowing a driver to select different drive modes of the vehicle 20. For example, a driver may select from among a plurality of different drive modes including a normal mode for everyday driving conditions, a sport mode for situations where the driver desires enhanced performance from the vehicle, and an enhanced traction mode when driving on an icy or gravel surface. A supervisory control means 36 provides control over the engine 24 and other features of the vehicle 20 to provide the vehicle response associated with the mode selected by the driver using the mode selection means 34.

In some examples, the drive mode selection means 34 comprises a selector situated within the passenger compartment where the driver can access the selector to indicate the driver's desired drive mode. Some examples include a driver interface that facilitates the driver making the mode selection. The supervisory control means 36 in some examples comprises a processor or electronic controller that is suitably programmed to perform functions such as adjusting the drive mode of the vehicle.

One feature of the clutch control means 30 is that it is configured to automatically control or adjust a characteristic of clutch engagement based upon which drive mode has been selected by the driver. The clutch control means 30 receives information from the supervisory control means 36 regarding which drive mode is currently in use. The clutch control means 30 also receives information regarding the position or condition of the manual clutch control means 32. The clutch control means 30 determines whether the clutch 22 should be engaged or released depending on the position or condition of the manual clutch control means 32.

Figure 3:
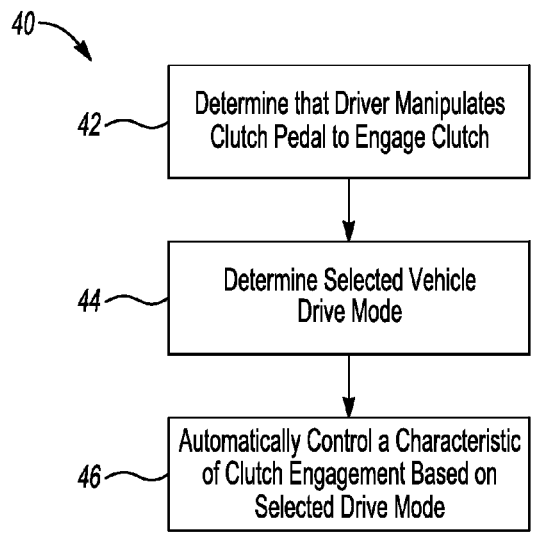
FIG. 3 is a flowchart diagram summarizing an example control strategy.

The clutch control means 30 of the illustrated embodiment adjusts a characteristic of clutch engagement using an approach summarized in the flowchart 40 of FIG. 3. At 42, the clutch control means 30 determines that the driver manipulates the manual clutch control means 32 in a way that indicates the driver's desire for the clutch to be engaged. At 44, the clutch control means 30 determines the currently selected vehicle drive mode. At 46, the clutch control means 30 automatically controls the characteristic of clutch engagement based on the currently selected drive mode.

This approach allows for the clutch control means 30 to change a relationship between the condition or position of the manual clutch control means (e.g., clutch pedal) and clutch engagement.

Figure 4:
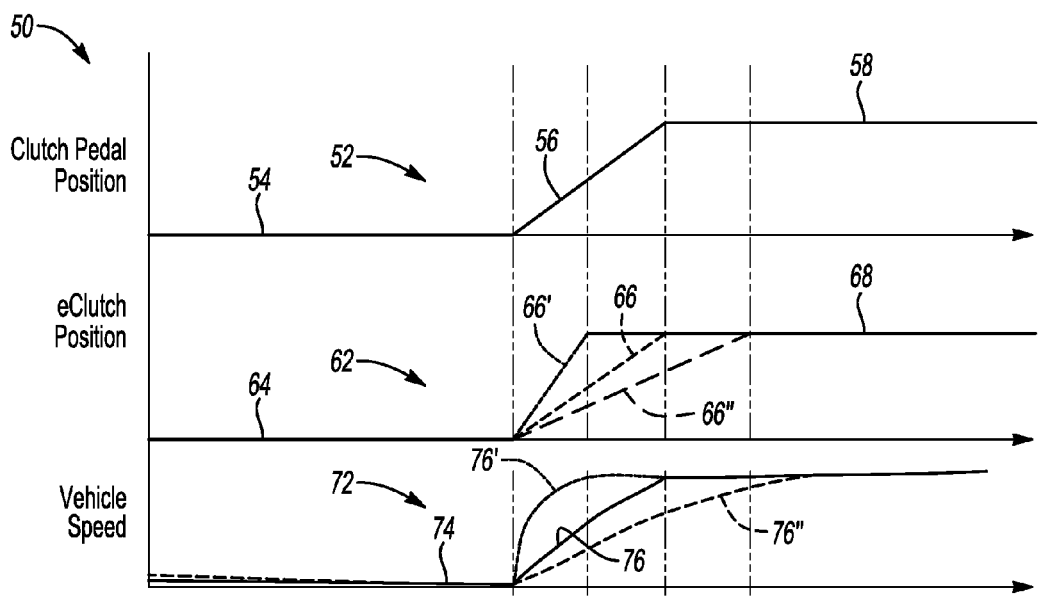
FIG. 4 illustrates example clutch engagement characteristics according to an embodiment of this invention.

FIG. 4 illustrates automatic control over a characteristic of clutch engagement according to an example embodiment. The relationships illustrated at 50 demonstrate how an engagement of the clutch 22 may be varied or adjusted based upon the selected drive mode to achieve a different driving experience or vehicle performance compared to a scenario in which the clutch engagement is based only upon the driver's manipulation of the manual clutch control means 32.

A first plot 52 represents the driver's manipulation of the manual clutch control means 32. A clutch pedal is used for discussion purposes as an example manual clutch control means. At 54, the clutch pedal is pressed and that condition of the clutch pedal corresponds to the clutch being open or disengaged. At 56, the driver releases the clutch pedal. At 58, the clutch pedal is in a fully released position corresponding to the driver's intention that the clutch 22 be engaged.

The plot 62 represents how the clutch control means 30 automatically controls the characteristic of clutch engagement based on the selected drive mode. At 64, the clutch is open or disengaged based upon the driver's manipulation of the clutch pedal. At 66, the clutch engagement follows the pattern of clutch pedal release represented at 56 when the drive mode corresponds to a normal driving mode. At 68, the clutch is fully engaged.

As can be appreciated by comparing the plots 52 and 62, the clutch engagement represented at 66 corresponds very closely to the clutch engagement based upon the manner in which the driver releases the clutch pedal represented at 56. In this example embodiment, a normal driving mode does not require the clutch control means 30 to make any significant adjustment to the characteristic of clutch engagement. In other embodiments, some adjustment will be made even in a normal driving mode.

Assume that the driver has selected a sport driving mode. Under this circumstance, the clutch control means 30 recognizes that the current drive mode is a sport mode and automatically controls the clutch engagement so that it occurs in a manner represented at 66'. As can be appreciated from the illustration, the clutch engagement occurs more quickly in the sport mode compared to the normal driving mode represented at 66. The clutch engagement at 66' occurs more quickly than it would have if the clutch pedal position were the only input for controlling clutch engagement. In the sport mode, the clutch control means 30 has caused a more dynamic or sharp engagement of the clutch 22 compared to the release of the clutch pedal. A more rapid clutch engagement during sport mode provides a more aggressive vehicle response and that may allow for an enhanced sport mode driving experience for some drivers.

Assume that the drive mode is an enhanced traction mode useful for driving on icy or gravel surface conditions. When an enhanced traction mode has been selected, the clutch control means 30 (e.g., a processor) adjusts a characteristic of the clutch engagement so that the engagement occurs in a manner represented at 66". As can be appreciated from the illustration, clutch engagement is more gradual in the enhanced traction mode compared to the normal driving mode represented at 66 and the sport mode represented at 66'. A slower or more gentle clutch engagement as represented at 66" provides for enhanced control over the vehicle and may result in an enhanced driver experience using the enhanced traction mode.

The plot 72 in FIG. 4 illustrates the resulting vehicle speed associated with the different characteristics of clutch engagement achieved by the clutch control means 30. At 74, the vehicle is at rest because the clutch is open. At 76, the vehicle speed increases with increasing clutch engagement in a manner that generally corresponds to the manner in which the driver releases the clutch pedal. At 76', a more rapid vehicle speed increase occurs because of the more sharp or dynamic engagement of the clutch. At 76", the vehicle speed increases more slowly because of the more gentle clutch engagement achieved at 66".

As can be appreciated from FIG. 4, the clutch control means 30 utilizes different relationships between pedal position and clutch engagement based upon which drive mode has been selected. In some example embodiments, the clutch control means 30 is programmed or otherwise provided with a mapping that indicates a desired clutch behavior corresponding to each possible drive mode for that vehicle. Three different variations of the clutch engagement characteristic are illustrated in FIG. 4 corresponding to three different drive modes. Some embodiments may include a larger number of different characteristics providing a larger number of variations in the relationship between clutch pedal position and clutch engagement.

In some embodiments the clutch control means 30 adjusts the engagement characteristic by adjusting a speed of clutch engagement. Other characteristics of clutch engagement could be adjusted as those skilled in the art may realize after considering this description.

The control over clutch engagement used in different embodiments may be realized in different manners. In some embodiments clutch engagement is based upon a map between the pedal travel and the clutch release bearing travel. One feature of such embodiments is that the lever ratio could be modified for any engagement dependent on the selected drive mode.

Other embodiments include a launch mode that uses closed loop engine speed control dependent on throttle position, the selected driving mode, clutch pedal travel and rate of clutch pedal movement. Effectively, the throttle commands the engine to deliver torque and the clutch is engaged to control the engine speed providing a smooth, efficient launch.

Other embodiments include a combination of the two modes described in the preceding two paragraphs. Such embodiments include a clutch pedal map for normal control of the clutch release mechanism but also monitor the engine speed response. If the engine speed rises too high, the clutch would engage more and conversely if the engine speed drops excessively during an engagement, the clutch would engage less. Some embodiments include a traction control input so the clutch may react to wheel slip by reducing engagement. This would reduce the torque to the transmission and hence control wheel slip. The engine may also need to react to control the engine speed as disengaging the clutch without reducing throttle input would allow the engine speed to increase.

In the examples above, clutch engagement is based on the selected drive mode, so any maps and control parameters, such as the closed loop gain, may vary between different drive modes.

The invention claimed is:

1. A torque delivery control system, comprising:
   a clutch that is at least partially automatically controllable;
   a clutch pedal configured to be manipulated by a driver to enable manual control of engagement of the clutch; and
   a control means configured to adjust a rate of the engagement of the clutch based on a selected drive mode,
   wherein, in a first drive mode, the control means is configured to cause engagement of the clutch to be effected at a first rate responsive to a given change in a position of the clutch pedal in a given period of time and,
   in a second drive mode, the control means is configured to cause engagement of the clutch to be effected at a second rate, different from the first rate, responsive to the same given change in the position of the clutch pedal in the same given period of time.

2. The system of claim 1, wherein in a third drive mode, the control means is configured to cause engagement of the clutch to be effected at a third rate, different from the first and second rates, responsive to the same given change in the position of the clutch pedal in the same given period of time.

3. The system of claim 2, wherein
the first drive mode comprises a normal drive mode;
the second drive mode comprises a sport or performance mode; and
the third drive mode comprises an enhanced traction mode.

4. The system of claim 3, wherein
the control means causes a more rapid engagement of the clutch during the second drive mode compared to engagement of the clutch during the first drive mode; and
the control means causes a slower engagement of the clutch during the third drive mode compared to engagement of the clutch during the first drive mode.

5. The system of claim 1, wherein
the clutch pedal is released to engage the clutch; and
the control means is configured to control the rate of the engagement of the clutch during driver release of the clutch pedal.

6. The system of claim 1, comprising
a drive mode selection means that is manually manipulatable for selecting the drive mode; and
a vehicle supervisory control means that determines the drive mode;
and wherein the control means determines the drive mode based on an indication from the vehicle supervisory control means.

7. A vehicle comprising the system of claim 1.

8. A method of controlling torque delivery using a clutch that is at least partially automatically controllable, the method comprising:
determining, from a driver's manipulation of a clutch pedal, that the driver desires clutch engagement; and
automatically adjusting a rate of engagement of the clutch based on a selected drive mode,
wherein, in a first drive mode, causing engagement of the clutch to be effected at a first rate responsive to a given change in a position of the clutch pedal in a given period of time and,
in a second drive mode, causing engagement of the clutch to be effected at a second rate, different from the first rate, responsive to the same given change in the position of the clutch pedal in the same given period of time.

9. The method of claim 8, wherein in a third drive mode, the automatically adjusting comprises causing engagement of the clutch to be effected at a third rate, different from the first and second rates, responsive to the same given change in the position of the clutch pedal in the same given period of time.

10. The method of claim 9, wherein
the first drive mode comprises a normal drive mode;
the second drive mode comprises a sport or performance mode; and
the third drive mode comprises an enhanced traction mode.

11. The method of claim 10, comprising
causing a sharper engagement of the clutch during the second drive mode compared to engagement of the clutch during the first drive mode; and
causing a gentler engagement of the clutch during the third drive mode compared to engagement of the clutch during the first drive mode.

12. The method of claim 8, wherein
the clutch pedal is released by the driver to engage the clutch; and
the rate of engagement is controlled during driver release of the clutch pedal.

13. A vehicle, comprising a controller that is configured to perform the method of claim 8.

* * * * *